US008515488B2

(12) United States Patent
Hillier et al.

(10) Patent No.: US 8,515,488 B2
(45) Date of Patent: Aug. 20, 2013

(54) SYSTEM FOR DYNAMIC ASSIGNMENT OF MOBILE SUBSCRIBER IDENTITIES AND METHODS THEREOF (75) Inventors: Peter Matthew Hillier, Ottawa (CA); Patrice Arruda, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 19 days.

(21) Appl. No.: 13/136,349

(22) Filed: Jul. 29, 2011

(65) Prior Publication Data
US 2013/0029637 A1    Jan. 31, 2013

(51) Int. Cl.
*H04M 1/00* (2006.01)
*H04M 11/00* (2006.01)
*H04M 3/00* (2006.01)
*H04M 15/00* (2006.01)
*H04W 4/00* (2009.01)

(52) U.S. Cl.
USPC ........... 455/551; 455/405; 455/418; 455/419; 455/432.1; 455/550.1; 379/114.27

(58) Field of Classification Search
USPC ....................................................... 455/551
See application file for complete search history.

(56) References Cited

U.S. PATENT DOCUMENTS

| 2009/0094680 | A1* | 4/2009 | Gupta et al. | 726/3 |
| 2010/0273462 | A1 | 10/2010 | Thorn et al. | |
| 2012/0252445 | A1* | 10/2012 | Lindholm et al. | 455/433 |

FOREIGN PATENT DOCUMENTS

| EP | 2139180 A1 | 12/2009 |
| WO | WO 2011/036484 A2 | 3/2011 |
| WO | WO 2011/057668 A1 | 5/2011 |

* cited by examiner

*Primary Examiner* — Huy C Ho (57) ABSTRACT

This disclosure generally relates to mobile subscriber identities for mobile devices, and more particularly, to dynamic assignment of International Mobile Subscriber Identities (IMSIs) to reduce roaming and overuse charges. Instead of using a reprogrammable embedded Subscriber Identity Module (SIM) card for remote activation of a device, mobile carrier charges, such as roaming and over limit usage fees, can be significantly reduced by reprogramming SIM cards dynamically from a pool of available mobile accounts. A smaller pool can be utilized to meet the needs of a large group, rather than a one-to-one association implemented within today's phones. Resource usage can be tracked and as one account reaches its maximum, a new account can be assigned to the mobile device to prevent overuse charges. Existing FMC concepts can insure single number inbound or outbound caller identification regardless of the name or number associated with the SIM card for the mobile device.

20 Claims, 6 Drawing Sheets

SYSTEM FOR DYNAMIC ASSIGNMENT OF MOBILE SUBSCRIBER IDENTITIES AND METHODS THEREOF

TECHNICAL FIELD

This disclosure generally relates to mobile devices, and more particularly, to dynamic assignment of mobile subscriber identities to those devices for reducing roaming and overuse charges.

BACKGROUND

Existing mobile plans associated with International Mobile Subscriber Identities (IMSIs) heavily penalize users who exceed their package limitations, for example, network over usage fees. Penalties also exist for those who frequently operate on other carrier networks identified by their IMSI, that is, roaming. While North American carriers are offering several unlimited data plans, for example Verizon's 4G LTE™, these carriers have begun terminating such plans. With Voice over LTE (VoLTE), billing voice minutes on these networks no longer apply in the traditional sense, and data billing, services, and "over usage fees" will now dominate wireless financials.

Fixed Mobile Convergence (FMC) strategies revolve around a fixed contact point which fans out to desk, mobile and other numbers. This fixed contact point can be associated with a corporate contact such as a Direct Inward Dialing (DID) number. Similar systems and methods exist for the reverse direction allowing calls, or optionally user selected calls, to be placed from these numbers so that they appear to originate from the corporate identity.

All accounts are associated to a user device by some means. A commonly used method is Subscriber Identity Module (SIM) cards, or equivalent, depending on the cellular service, for example, Global System for Mobile Communications (GSM™), Code Division Multiple Access (CDMA), Universal Mobile Telecommunications System (UMTS), etc. SIM cards securely store a service-subscriber key, such as an IMSI, to identify a subscriber of mobile telephony devices. Embedded programmable SIM cards are coming into focus as a means for remote activation of devices and other uses. A task force was recently created on Nov. 17, 2010 with the goal of releasing standards for embedded programmable SIMs by 2012.

For now, however, to overcome the challenges of roaming and overuse charges, a user can carry multiple devices containing a SIM card with accounts local to specific countries. If the mobile device is a GSM™ device, or if both countries support the same cellular standard, multiple SIM cards can be used to insure local use charges, that is, SIM swapping. Sharing mobile devices or SIM cards between employees can reduce costs but requires reprogramming of a Private Branch Exchange (PBX) FMC solution to address the move of the mobile number to another employee. Removable programmable SIM cards exist today but require the use of a hardware reader/programmer to complete the task. Often, this is manually intensive.

A company known as TRU uses an eight-in-one programmable SIM to eliminate SIM swapping. This requires that the card be pre-programmed, using a physical SIM programmer, with the user accounts. The TRU solution allows up to eight accounts, which can correspond to eight different countries. A client application by TRU uses the location information to select the desired preprogrammed entry from the pre-programmed SIM card. This solution, however, requires that all travelers have their own multiple accounts. It is not integrated with any FMC solution and is not intended to reduce the number of accounts required by a company. Other software applications exist to track data, such as voice and Short Message Service (SMS) usage, and can set thresholds to alert the user to alter their behavior to avoid overuse charges. This can be enforced by corporate mobile management software solution.

A need exists for programmable SIM cards operating within a mobile number pool and methods thereof that overcome those issues described above. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

This disclosure generally relates to mobile subscriber identities for devices, and more particularly, to dynamic assignment of International Mobile Subscriber Identities (IMSIs) to those devices for reducing roaming and overuse charges. Instead of using a reprogrammable embedded Subscriber Identity Module (SIM) card for remote activation of a device, mobile carrier charges, such as roaming and over limit usage fees, can be significantly reduced by reprogramming SIM cards dynamically from a pool of available mobile accounts. A smaller pool can be utilized to meet the needs of a large group, rather than a one-to-one association implemented within today's phones. In one illustrative embodiment, mobile account pools can exist per location which can be selected depending on the mobile device's location to eliminate roaming. For example, a pool of IMSIs can be provided for Canada. Another pool can exist for the United States and still yet, another pool can be provided for the United Kingdom. Within the local pools, resource usage can be tracked and as one account reaches a defined threshold, a new account can be assigned to the mobile device to prevent overuse charges. Existing Fixed Mobile Convergence (FMC) concepts can insure single number inbound or outbound caller identification regardless of the name or number associated with the SIM card for the mobile device.

A number of advantages can be offered by the embodiments of the present disclosure described herein. Using dynamic IMSI assignment can reduce roaming and overuse charges. In FMC solutions, the IMSIs can bind a work number to an employee allowing the sharing of minutes and data usage. This allows the mobile number associated with an employee to change several times, similar to an IP address, without impacting the ability of the employee to make and receive work related calls. The pool of IMSIs can be updated periodically with mobile usage information. The IMSI pools can be monitored with respect to account restrictions as well. When a situation occurs where overuse billing is detected, a new IMSI and associated information can be provided for programming the SIM device. Many additional advantages of the present disclosure will become apparent to those skilled in the relevant art as provided for in the following description.

Figure 5:
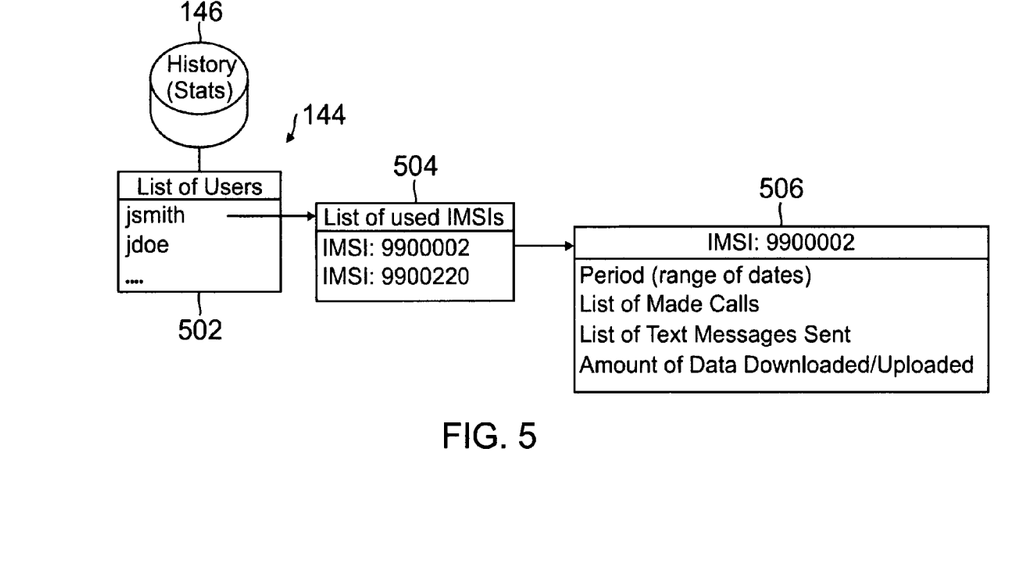
FIG. 5 is a block diagram showing an exemplary database storing statistics for the mobile subscriber identity pool in accordance with one or more aspects of the present disclosure.
Figure 6:
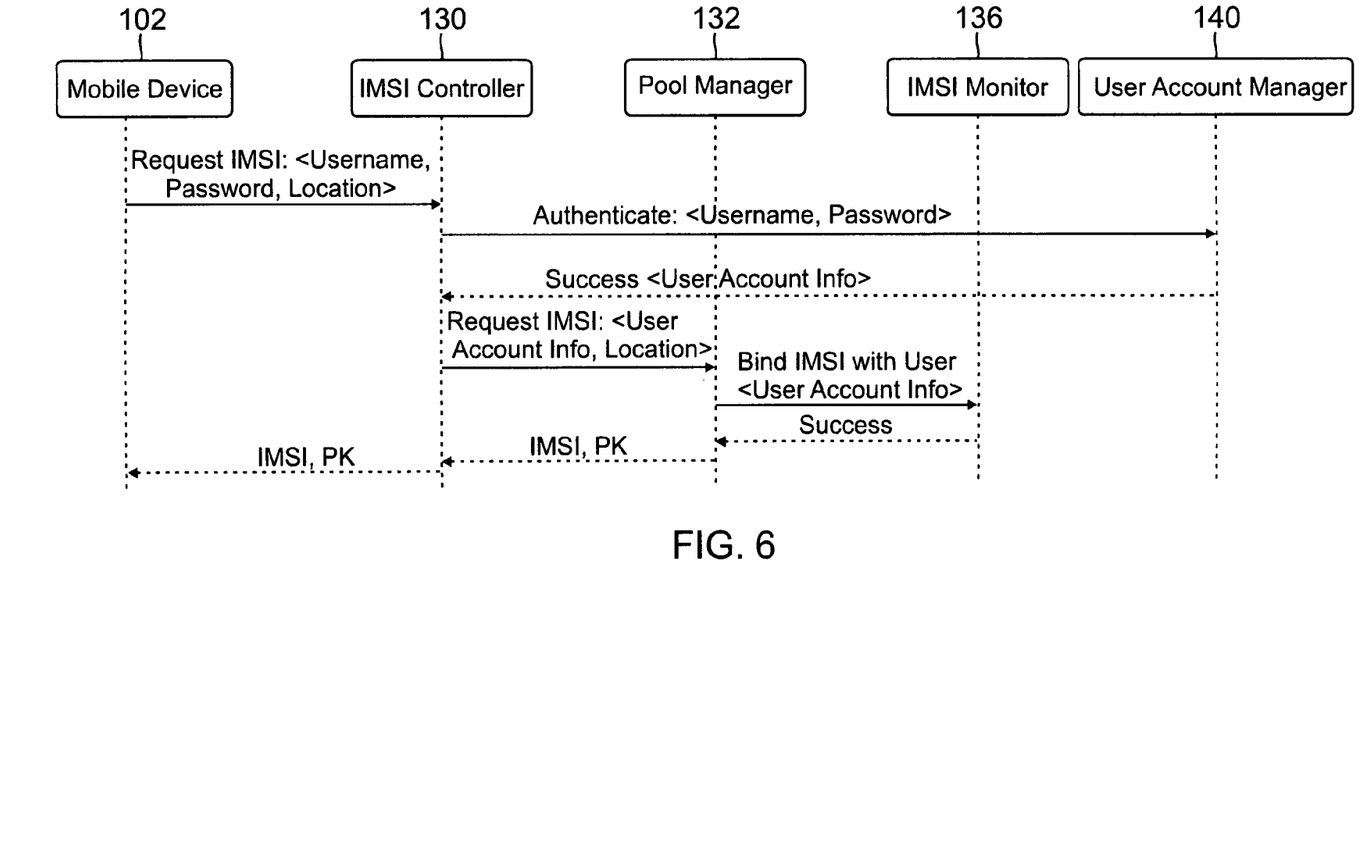
FIG. 6 is a schematic depicting generic processes for requesting unique identifications from the mobile subscriber identity pool in accordance with one or more aspects of the present disclosure.
Figure 7:
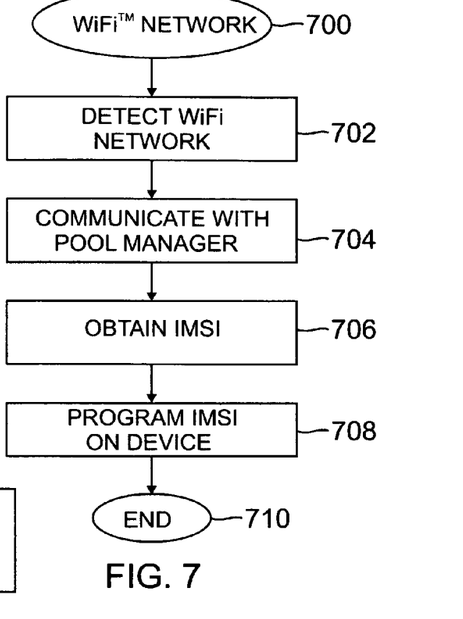
FIG. 7 is a flow chart showing generic processes for obtaining a unique identification through a WiFi™ network in accordance with one or more aspects of the present disclosure.
Figure 8:
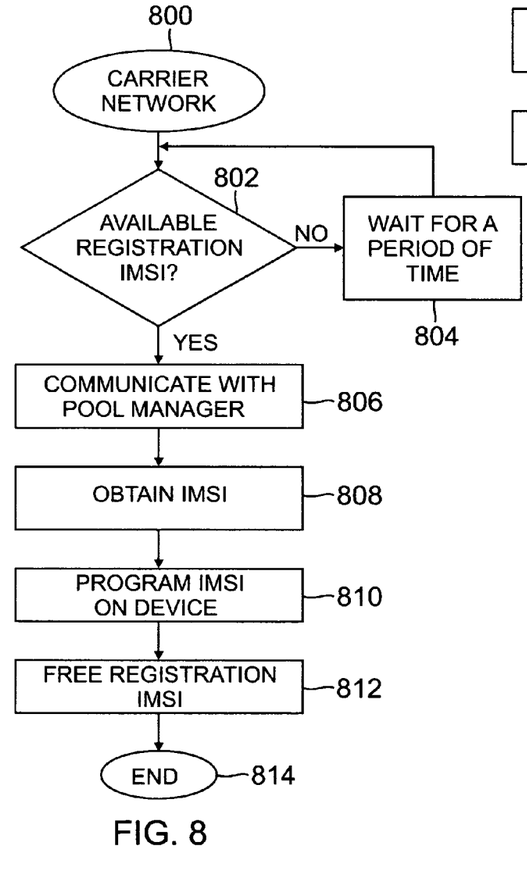
FIG. 8 is a flow chart showing generic processes for obtaining a unique identification through a carrier network in accordance with one or more aspects of the present disclosure.
Figure 9:
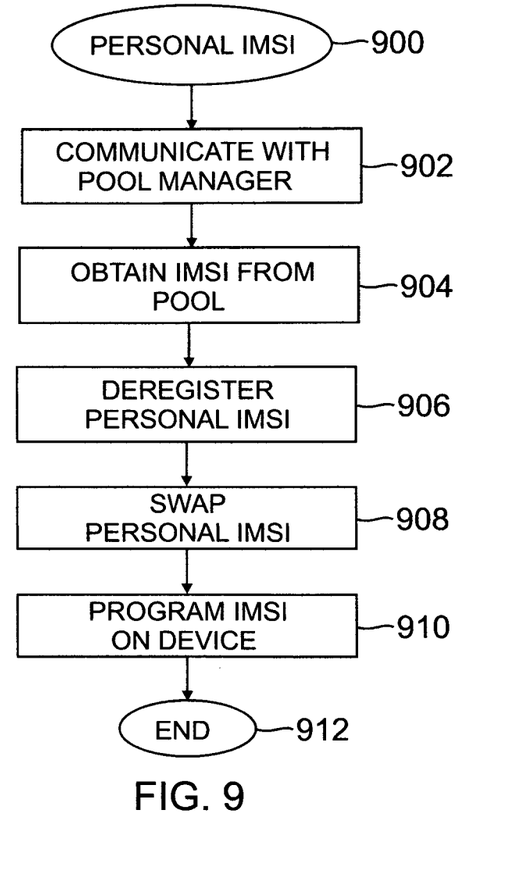
FIG. 9 is a flow chart showing generic processes for obtaining a unique identification through a personal identification in accordance with one or more aspects of the present disclosure.

Described below, FIGS. 1 through 5 will provide details of an exemplary IMSI pool, and more specifically, hardware and software features of the pool. FIG. 6 then depicts generic processes for retrieving an IMSI. FIGS. 7 through 9 will show different arrangements for obtaining the IMSI. Used throughout the present disclosure, the term IMSI can also be referred to as a mobile subscriber identity, unique identification or simply, identification. An IMSI can generally refer to a unique identification associated with Global System for Mobile Communications (GSM™) and Universal Mobile Telecommunications System (UMTS) networks for mobile usage. Other mobile subscriber identities can be used and are dependent on the type of cellular service. For example, Code Division Multiple Access (CDMA) can have its own unique identifier. Mobile device, for purposes of the present disclosure, can also be referred to as device. The mobile device can include a cell phone, Personal Digital Assistant (PDA), smartphone, web tablet, laptop computer, pocket PC, mobile IP device, players, etc. The system can also be used in other electronic devices, for example, notebooks and netbooks. A number of devices can be used to receive the IMSIs and will become more apparent from the disclosure provided below. These devices can be part of an FMC solution.

Figure 1:
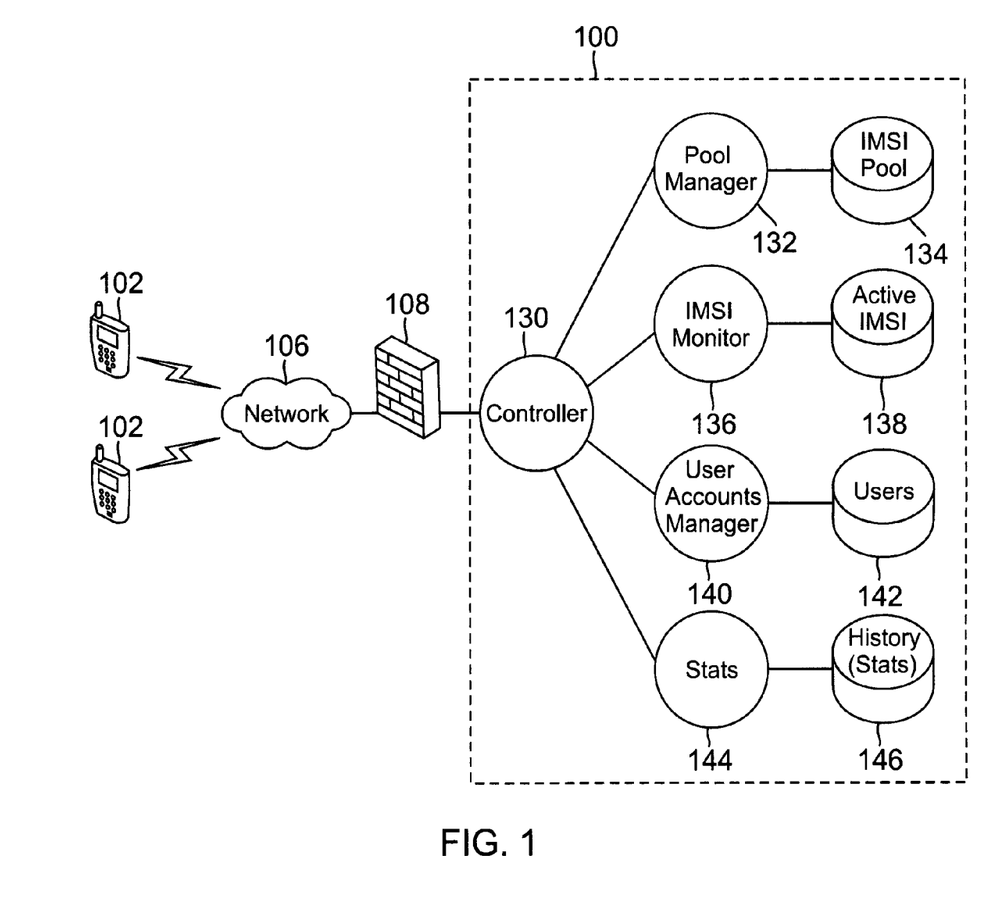
FIG. 1 is a block diagram depicting an illustrative architecture of a mobile subscriber identity pool in accordance with one or more aspects of the present disclosure.

Turning now to FIG. 1, a block diagram depicting an illustrative architecture of a mobile subscriber identity pool 100 in accordance with one or more aspects of the present disclosure is provided. Those skilled in the relevant art will appreciate that fewer or more components within the environment can be used or removed. Within the environment shown, the mobile devices 102 can communicate through a network 106 with the pool 100. This communication can take place wirelessly or through a wireline connection. The mobile devices 102 can be connected to the network 106 through logical connections. The network 106 can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks 106.

A firewall 108 can be provided within the environment such that the devices 102 are authorized before given access to communicate with the pool 100. The firewall 108 can include a set of components designed to deny transmission of data to and from the pool 100 while permitting legitimate communications to pass. Malicious programs can be prevented by the firewall from interfering with normal communications.

The IMSI pool 100 can operate on a traditional server or web server. In one embodiment, the pool 100 functions on a Private Branch Exchange (PBX), known to those skilled in the relevant art. The server or PBX can include an operating system and software instructions, ROM, RAM, at least one processor, network interface and data storage. The server or PBX can process requests from the mobile devices 102 or any other component within the environment. The server or PBX can typically handle high volumes of transactions and large amount of queries for communication and data processing. RAM and ROM are used to support the program codes that are operated by the processor. The memory can be in a form of a hard disk, CD ROM, or equivalent storage medium. The processor can support the authentications such as communications from external data servers, as well as allowing for anonymous transactions and general data encryption.

The data storage of the IMSI pool 100 can include hard disk magnetic or optical storage units, as well as CD ROM, CD RW or DVD ROM and flash memory such as compact flash and secure digital cards. The data storage contains databases used in the processing of transactions. Conventional Ethernet technology or internal or external modems can serve as the network interfaces. A cable or DSL modem can be used as a network interface. While the above embodiment describes a single computer system acting as the server or PBX, the functionality can be distributed over multiple computing systems. The databases can also be distributed over a cloud computing environment known to those skilled in the relevant art. In one embodiment, the server or PBX is configured in a distributed architecture, wherein the databases and processors are housed in separate units or locations. Other known types of hardware can be used to implement the pool 100.

Behind the firewall 108, within the pool 100, a number of web services and databases are provided. As shown in FIG. 1, the pool 100 can include an IMSI controller web service 130. The mobile devices 102 can communicate with the IMSI controller 130 for requesting or updating services. The controller 130 can make decisions based on the current state of the mobile devices 102. The controller 130 can communicate with a number of other web services including a pool manager 132, IMSI monitor 136, user accounts manager 140 and stats 144. Each of these can be connected to a corresponding database. The pool manager web service 132 can be coupled with an IMSI pool database 134, the IMSI monitor web service 136 can be tied to an active IMSI database 138, the user accounts manager web service 140 can be connected with a users database 142 and the stats web service 144 can be coupled to a history (stats) database 146. While web services have been described, those skilled in the relevant art will appreciate that other types of implementations can be used and do not have to be limited to web based services.

The pool 100 can provide devices 102 with IMSIs that are linked to an account. These unique identifications can also be paired with an authentication or private encryption key so that the mobile devices 102 can properly access the accounts. The pool 100 can maintain and allocate IMSIs, which correspond to mobile accounts, to devices 102 as needed or required. By doing this, the pool 100 can dynamically avoid overuse and roaming charges. The pool 100 can map or share cellular numbers among users by dynamically updating FMC programming. Typically, the same number is not shared by two devices 102 simultaneously. Rather, it can be deassigned from one device 102 and reassigned to another. This can be ideal for shift work or multi-time zones. This can reduce the number of mobile accounts a corporation needs to maintain. A number of different scenarios can be imaged by one skilled in the relevant art where dynamically allocating IMSIs would be beneficial.

During WiFi™ usage periods, the IMSI can be returned to the pool 100 for increased or mandated recycling to enforce least cost calling behaviors. The pool 100 provides a common IMSI to be used as a fallback to insure communication to the server managing the pool 100 such that a unique IMSI can always be obtained. A resource arbitration scheme to allow many devices to share the same common or well known IMSI for purposes of establishing temporary communication with the server and obtaining a unique IMSI can be provided by the pool 100. By deploying a proper FMC solution and pooling mobile accounts, and assigning IMSIs when the mobile device is out of WiFi™/Pico coverage zone, a corporation can drastically slash its mobile account costs. In its simplest form, if WiFi™ coverage is available in the office and at home, the mobile number is only assigned when the employee is in transit.

In one embodiment, the mobile devices 102 can run mobile applications that communicate with the pool 100 by sending and receiving information. These mobile applications can request or relinquish an IMSI in a number of different situations. When no other transport, for example WiFi™, is available, the mobile devices 102 can request for an IMSI. The IMSI, in one embodiment, can be based on location. An IMSI can be demanded by the user or based on cellular network identification, for example, when roaming is detected.

The pool 100 can also assign or reclaim IMSIs. For example, when roaming is detected, IMSIs can be reassigned. A more appropriate IMSI can then be provided. In one embodiment, when the accounts associated with the IMSIs are overused or reach a defined threshold, an available or new IMSI can be assigned. Furthermore, IMSIs can be reassigned when higher priority is needed to swap accounts. Priority can be given to higher-level functioned employees.

Figure 2:
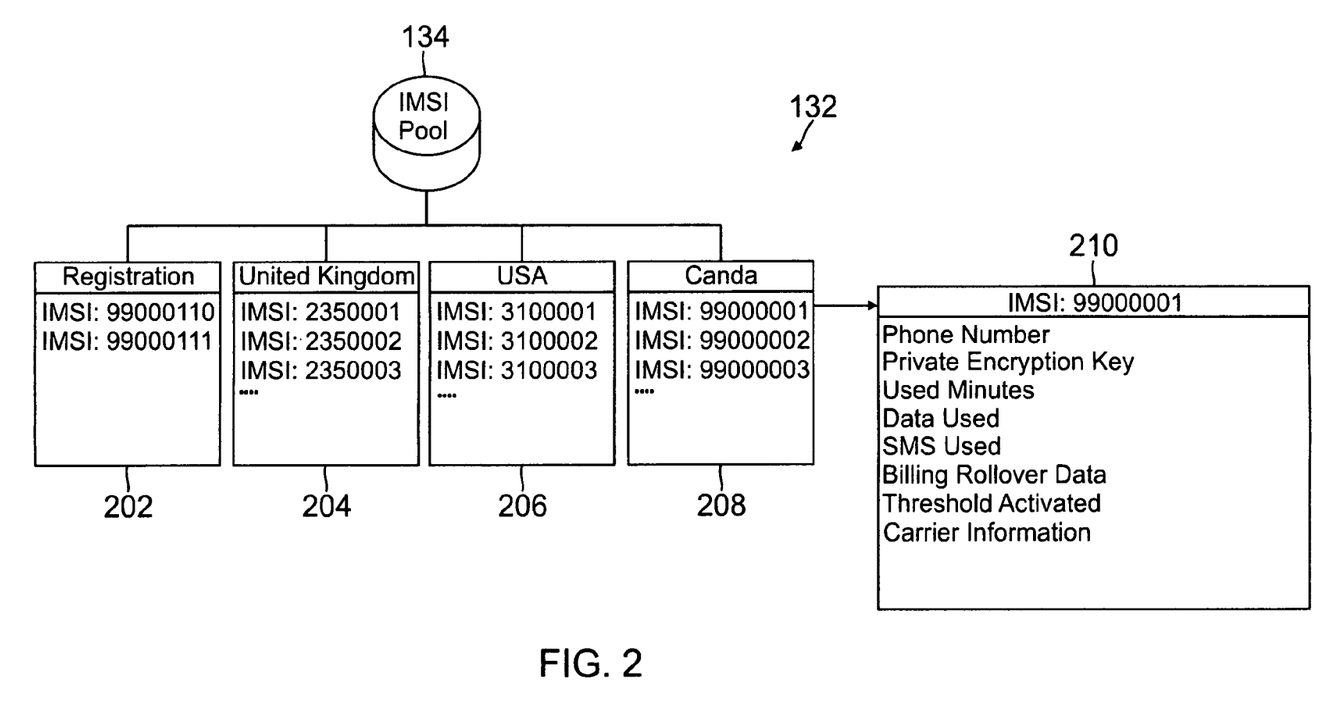
FIG. 2 is a block diagram showing an exemplary database storing unique identifications for assignment to mobile devices in accordance with one or more aspects of the present disclosure.

Referring to FIG. 2, a block diagram showing an exemplary database 134 storing unique identifications for assignment to mobile devices 102 in accordance with one or more aspects of the present disclosure is provided. The IMSI pool 100 can have administrator privileges which allow IMSI, that is SIM information, to be programmed into the mobile devices 102. The IMSI pool web service 132 can manage each of these IMSI entries independently with respect to voice minutes used, data kilobytes used, and so forth. In the case of a company, the name associated with the accounts could all be similar, as they have no bearing with a proper FMC solution.

The pool manager 132 can communicate with the controller 130 such that the IMSIs can be accounted for and tracked. The unique identifications can be separated into different categories within the database 134 associated with the IMSI pool web service 132. The IMSIs shown do not necessarily reflect the value of an actual IMSI and can vary dependent on the type of network as well as the carrier, continent and country of the service provider. The term IMSI can refer to a cellular account. In one embodiment, the IMSI pool manager 132 can identify each sub pool at blocks 202, 204, 206 and 208 with a key prefix 990, 235, 310 and 990. Each account in the sub pool can then have a unique suffix. The shown grouping can provide uniqueness to each mobile account, but can vary dependent on the implementation.

One category can be associated with registration IMSIs at block 202. As will be shown in FIG. 7, these registration IMSIs can be used to acquire IMSIs for the mobile devices 102. In one embodiment, the IMSIs can be broken down into locations. For each of these locations, sub pools can be provided. For example, IMSIs for the United Kingdom can be placed into a sub pool at block 204, IMSIs for the United States can be stored into a sub pool at block 206 and IMSIs for Canada can be placed into a sub pool at block 208. Known to those skilled in the relevant art, the IMSIs can vary and be provided in a number of different forms dependent on the service used. In this embodiment the unique identifier is simply used to group and manage the pool of mobile accounts, and does not reflect the actual value of the IMSI itself.

Continuing with FIG. 2, at block 210, components of an IMSI will be described. The IMSI can be associated with a phone number. In one embodiment, the phone number can correspond to a company phone that can be used for a number of different people. A private encryption key can also be provided. The private encryption key can be used to protect data or conversations interchanged through the network 106. Within each of the IMSIs, minutes, data, Short Message Service (SMS) and Multimedia Messaging Service (MMS) usage can be kept tracked of. Other information can also be accounted for such as billing rollover data. The SIM can contain an encryption key to encrypt the IMSI such that it cannot be seen or copied.

The IMSI can also keep track of whether the threshold of usage has been reached or activated. Typically, the threshold is activated when any portion of the account has been overused. For example, if the amount of voice minutes or data usage allocated for the IMSI has been completely drained or used, the threshold is activated. Alternatively, the threshold can be activated if the amount of voice or data usage is about to reach a maximum amount defined by a plan associated with the IMSI. Threshold can generally refer to the maximum voice or data usage before incurring additional costs. In one embodiment, the pool 100 can be used to manage individual usage. For example, the IMSI can indicate that the maximum amount of voice minutes has been used, but SMS data is still available. Other information, known to those skilled in the relevant art, can be kept about the carrier for the IMSI.

In one embodiment, when the account has reached the defined threshold, the IMSI monitor web service 136 can send a message to the controller 130 that the account associated with the IMSI is about to be overcharged. The controller 130 can then send a message to the mobile device 102 to update their IMSI. In other cases where the mobile device 102 or the IMSI controller web service 130 is unable to communicate with each other, the IMSI can be returned to the pool 100 if no status update messages are sent or received within a window period.

Figure 3:
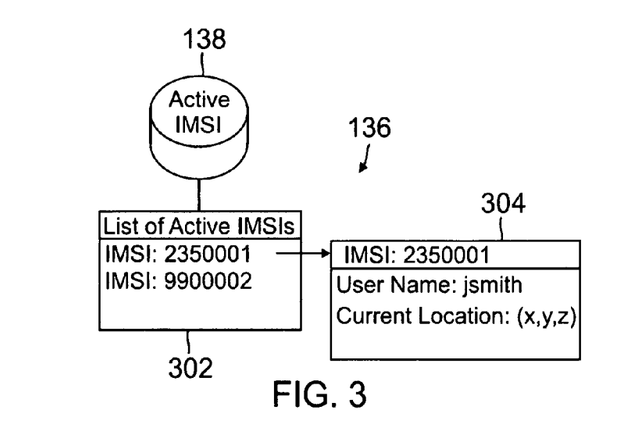
FIG. 3 is a block diagram showing an exemplary database maintaining active identifications in accordance with one or more aspects of the present disclosure.

FIG. 3 is a block diagram showing an exemplary database maintaining active identifications in accordance with one or more aspects of the present disclosure. When the mobile devices 102 are connected to a network 106, either through WiFi™ or a data carrier network, the devices 102 occasionally send messages to the IMSI pool 100 for updating its status. A "Keep Alive" message can be sent to determine whether the device 102 actively requires the IMSI on the carrier network or does not require an IMSI on the WiFi™ network. The devices 102 can fail, loose battery power, move out of range, etc., and the ability to optionally return the IMSI to the pool for reuse needs to be considered.

The IMSI monitor web service 136 can keep track of active IMSIs of the pool 100 through database 138. If a "Keep Alive" message was not received over a period of time, for example five minutes, the IMSI can be removed from the IMSI monitor web service 136 and out of the database 138. The IMSI can then be returned to the pool 100 for reuse, which was depicted in the pool manager 132. In one embodiment, if the devices 102 are not able to send "Keep Alive" messages over a period of time to the IMSI monitor web service 136, the mobile devices 102 reject the IMSI and request for another IMSI when network connectivity is available. Generally, this is mandatory since the lack of a "heartbeat" acknowledgement implies that the server has pulled the IMSI away from the devices 102 and placed it back into the pool manager 132. It is possible that the IMSI can be assigned to other devices 102 while the mobile device 102 which previously had the IMSI was not in a service area. In one embodiment, an end user can initiate the removal of the IMSI. An administrator management scheme can also be used to deassign IMSIs. Regardless of whether an IMSI is assigned, or there is a complete lack of an IMSI, emergency services are not affected per carrier design and regulatory requirements.

As shown in FIG. 2, the pool manager 132 can manage IMSIs for several geographic regions. From this pool, there are two active mobile users identified by the active IMSI database 138 at block 302: IMSI 2350001 and IMSI 9900002. Client applications on two separate devices 102 have communicated with the pool manager 132 and requested, and been assigned an IMSI from the IMSI pool database 134. Typically, IMSIs can only be assigned to known users, for example, those users who have been setup by an administrator. At block 304, additional details are shown for user jsmith, which corresponds to John Smith, having been assigned IMSI 2350001. A current location for John Smith can also be part of the information attached at block 304. A link to the IMSI pool database 134 can be provided for each of the active IMSIs.

Figure 4:
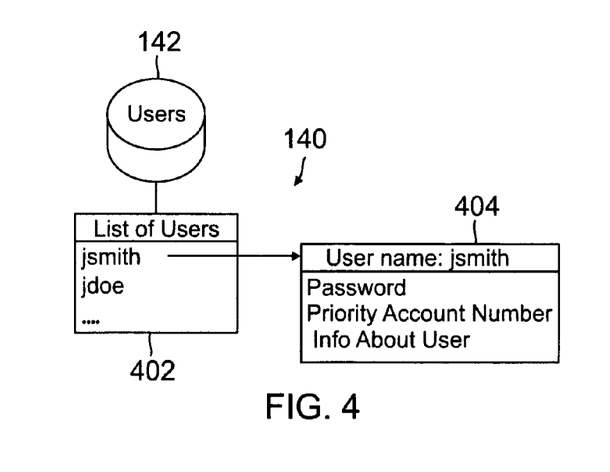
FIG. 4 is a block diagram showing an exemplary database storing a list of users in accordance with one or more aspects of the present disclosure.

FIG. 4 is a block diagram showing an exemplary database 142 for a user accounts manager web service 140 in accordance with one or more aspects of the present disclosure. The manager 140 can be tied to the active IMSI database 138. Specifically, the users database 142 can be linked to the active IMSIs at block 304. At block 402, the users database 142 can maintain a list of all current users. This can be updated through the mobile devices 102 themselves or through an administrator. Permissions and security can be kept such that unauthorized individuals are not able to access the IMSIs.

Administrators, or the like, can update the list of users at block 402 including adding and deleting users who have access to the pool 100 of IMSIs. Typically, the user has to be within the users database 142 before being provided with an IMSI from the pool 100. As shown in FIG. 4, username jsmith, corresponding to John Smith, and username jdoe, corresponding to Jane Doe, have been stored within the database 142. At block 404, information about each of the users can be maintained. A password and a priority account number can be stored for each user. Other information known to those skilled in the relevant art can also be maintained.

In typical embodiments of the pool 100, statistics or the history of the users can be kept tracked of. FIG. 5 is a block diagram showing an exemplary database 146 storing statistics for the pool 100 in accordance with one or more aspects of the present disclosure. The database 146 can store a list of users at block 502. Username jsmith, corresponding to John Smith, and username jdoe, corresponding to Jane Doe, have been stored within the database 146. In one embodiment, the database 146 can be the same or linked with database 142.

At block 504, the username can then be associated with a list of used IMSIs. As shown, John Smith has used IMSI 9900002 and IMSI 9900220. At block 506, information about the specific IMSI usage can be kept. The information collected about each IMSI can be grouped for each IMSI. Alternatively, multiple entries for each IMSI can be kept tracked of. The period or range of dates that the IMSI was used can be stored. A list of made calls, list of text messages sent and the amount of data downloaded or uploaded can be kept tracked of as well. Other pertinent information can also be monitored such as the minutes used to call company clients versus personal calls. Such statistics are important for security, expense accounting, etc.

While shown as separate databases within FIGS. 1 through 5, the information stored within the pool 100 can be kept on a single database. Furthermore, the web services and databases do not necessarily have to be broken out in such a format, but for clarity of the present disclosure has been done so. As can be seen, each database can be linked together. For example, block 204 of FIG. 2 can be linked with block 302 of FIG. 3 showing that there active IMSIs. Furthermore, block 304 of FIG. 3 can be linked with block 402 of FIG. 4 providing that the active links are associated with a user who has privilege to access the IMSIs. Other links can exist known to those skilled in the relevant art.

FIG. 6 is a schematic depicting generic processes for requesting unique identifications from the mobile subscriber identity pool 100 in accordance with one or more aspects of the present disclosure. These general processes have been developed for mobile devices 102 for requesting an IMSI. Fewer or more processes can be removed or added from the illustration. As shown, the mobile device 102 can send the user identification to the IMSI controller web service 130. Passwords can also be sent by the mobile device 102 for proper authentication. In one embodiment, the current location of the user can also be sent. The location can help to identify which IMSI is the best to assign to the device 102. FIG. 2 showed that the IMSI pool database 134 can be divided into a set of sub pools, where each pool referred to a particular terrain. The terrain can represent different countries. The pools can also represent provinces or states.

In one embodiment, the pools can be represented by categories of employment. For example, project leads can use one pool of IMSIs while engineers can use another. Pools can also be separated by projects such that a single project is given a certain amount of IMSIs for communications. Known to those skilled in the relevant art, other pool categories can be implemented and are not limited to those described above.

Continuing with FIG. 6, when the IMSI controller web service 130 receives a request, it can first ask the user accounts manager web service 140 to authenticate and authorize the mobile device 102 using the provided username and password. If the process was successful, the user account information is returned to the controller 130 from the user accounts manager web service 140. The controller 130 then makes a request to the pool manager web service 132 to provide an available IMSI according to the location or other criteria. The pool manager web service 132 locates or finds the next available IMSI and sends a message to IMSI monitor web service 136 to bind the IMSI with the user account information. In turn, the IMSI monitor web service 136 makes the association of the IMSI and the user account and begins monitoring the account. Once the association is made, the controller 130 can return the IMSI with the private encryption key used for the carrier network. The IMSI and the key can thereafter be programmed into the mobile device's SIM card.

When the mobile device 102 is activated, the mobile device 102 typically makes a request for an IMSI. There are several methods for doing this. FIG. 7 is a flow chart showing generic processes for obtaining a unique identification through a WiFi™ network in accordance with one or more aspects of the present disclosure. Fewer or more processes can be implemented. The processes can begin at block 700. The primary method for making the request is where the mobile device 102 detects a WiFi™ network. After detecting a WiFi™ network, at block 702, the mobile device 102 can communicate with the pool manager 132 at block 704. A request can be made directly through the Internet to the pool 100 for an available IMSI. The IMSI can then be obtained through those processes described above at block 706. At block 708, the IMSI can be programmed on the device 102. The processes can end at block 710.

FIG. 8 is a flow chart showing generic processes for obtaining a unique identification in a carrier network in accordance with one or more aspects of the present disclosure. The processes can being at block 800 with fewer or more processes capable of being removed or added. Typically, the carrier network that the mobile device 102 is connected to can be used to retrieve an IMSI when the WiFi™ network is unavailable. In this scenario, the mobile device 102 does not have an IMSI, so the carrier network cannot be accessed. Since it also does not have WiFi™ connectivity, there is generally no way to communicate with the pool manager 132. To resolve this, an initial or well known IMSI can be used in order to communicate with the data carrier. As shown in FIG. 2, at block 202, the IMSI pool 100 reserves several IMSIs for registration purposes. The registration IMSIs can be synchronized with the mobile application on the mobile devices 102 periodically when WiFi™ is available. Alternatively, the registration IMSIs can be embedded into the mobile application at build or application download time. If carriers adopted a standard for requesting IMSIs from a pool 100, generally this process would not be required. Presently, however, every mobile device 102 has an IMSI in order to register and use the carrier network (emergency calls are exempt from this rule).

At decision block 802, the mobile device 102 waits for an available registration IMSI. Typically, the mobile device 102 can use the registration IMSI as a temporary means of communication with the pool manager 132 in order to obtain an available IMSI. Carrier networks often do not allow multiple devices 102 to use the same IMSI simultaneously, that is, the same subscriber cannot be active on two different devices 102. Logic can be provided by the mobile application that if the connection is interrupted while using a registration IMSI to communicate with the pool manager 132, it uses the next available registration IMSI. When no other registration IMSIs are available, the device 102 waits for a period of time at block 804 to allow other mobile devices 102 to complete their IMSI request and then restart their registration process. If there is an available registration IMSI, the mobile device 102 can communicate with the pool manager 132 at block 806. The IMSI can then be obtained through those processes described above at block 808. At block 810, the IMSI can be programmed on the device 102. The registration IMSI can be freed at block 812 so that other devices 102 can use the well known registration IMSI. At block 814, the processes can end.

In another method for retrieving an IMSI, a personal identification associated with the mobile device 102 can be used. This can best describe the business model of "Bring your Own Device (BYOD)", where employees bring their personal devices 102 to work. In this scenario the device 102 always has the personal IMSI which can be used to kick start the communications with the pool manager 132. FIG. 9 is a flow chart showing generic processes for obtaining a unique identification when the device 102 contains a personal identification in accordance with one or more aspects of the present disclosure. Fewer or more processes can be used. The processes can begin at block 900. In these processes, the mobile device 102 contains a personal IMSI that can be swapped by an IMSI from the pool manager 132. For example, the pool manager 132 can replace a personal SIM for a business SIM. In this case, WiFi™ is not required nor is a registration IMSI.

At block 902, the mobile device 102 can communicate with the pool manager 132 through the personal IMSI. The IMSI can then be obtained through those processes described above at block 904. At block 906, the personal IMSI is deregistered. By deregistering the personal IMSI, personal calls or data to the device 102 can be sent to voicemail or be given out-of-service options. At block 908, the personal IMSI is swapped with an IMSI attached to an account. The personal account can be used to communicate and obtain another IMSI from the pool. In this case, the mobile application remembers the personal IMSI information such that it can reprogram the SIM when required. At block 910, the IMSI can be programmed on the device 102. At block 912, the processes can end.

Other configurations or embodiments of the present application can be implemented. In one embodiment, the mobile device 102 can have a dual SIM card. One SIM card can be for personal use, while the other can be used for the IMSI dynamic allocation described above. In a corporate setting, a person who is authorized to travel can be added to the pool manager 132, which allows a corporate IMSI to be reserved by the user's mobile device 102. Alternatively, when multiple devices 102 and a single IMSI are used, the IMSI can be programmed into any programmable SIM on these devices 102. This can allow a personal user with a single carrier account to use the account with multiple devices 102. This can include a home phone, cell phone, tablet, automobile, desk phone, hotel room phone, etc. of a single party, but be replicated over many devices. Any device 102 which supports SIM programming and has a cellular radio can typically be used. This can be done using location, preference (when in the vicinity of multiple devices), battery life, safety regulations (car phone usage over cell phone), etc. Thus, forgetting a cell phone at home would not prevent a user from making and receiving phone calls.

The data structures and code, in which the present disclosure can be implemented, can typically be stored on a non-transitory computer-readable storage medium, which can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The FIGURES and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims. All structural and functional equivalents to the elements of the various embodiments described throughout this disclosure that are known or later come to be known to those of ordinary skill in the relevant art are expressly incorporated herein by reference and intended to be encompassed by the claims.

What is claimed is:

1. A method of dynamically assigning a mobile subscriber identity to a device comprising:
   receiving a user identification and a request for a mobile subscriber identity from a device;
   authenticating said user identification received from said device;
   assigning a mobile subscriber identity to said device in response to said request;
   associating said mobile subscriber identity with said user identification; and providing said mobile subscriber identity to said device, wherein assigning said mobile subscriber identity to said device comprises comparing the level of usage of said device with subscriber information, and selecting a mobile subscriber identity in dependence upon the result of the comparison.

2. The method of claim 1, wherein authenticating said user identification comprises determining whether a user associated with said user identification has access to a pool of mobile subscriber identities.

3. The method of claim 1, wherein the level of usage represents the available minutes or data of said device.

4. The method of claim 1, comprising:
   disassociating said mobile subscriber identity with said user identification when said mobile subscriber identity provided to said device reaches a defined threshold;
   assigning a new mobile subscriber identity to said device;
   associating said new mobile subscriber identity with said user identification; and
   providing said new mobile subscriber identity to said device 5. The method of claim 4, comprising returning said mobile subscriber identity to a pool of mobile subscriber identities.

6. The method of claim 1, comprising receiving monitoring messages from said device and keeping said mobile subscriber identity active.

7. The method of claim 6, comprising disassociating said mobile subscriber identity with said user identification when failing to receive said monitoring messages and returning said mobile subscriber identity to a pool of mobile subscriber identities.

8. The method of claim 1, comprising receiving a current location of said device and wherein assigning said mobile subscriber identity to said device comprises selecting said mobile subscriber identity based on said current location of said device.

9. A system comprising:
a server managing a pool of unique identifications;
wherein said server receives a request for a unique identification from said pool of unique identifications by a mobile device, determines an availability of a unique identification and provides said unique identification and a private encryption key to said mobile device when said unique identification is available, said unique identification and private encryption key programmed into a subscriber identity module card of said mobile device for establishing communications,
wherein determination of the availability of a unique identification comprises the server comparing the level of usage of the mobile device with subscriber information, and selecting a mobile subscriber identity in dependence upon the result of the comparison.

10. The system of claim 9, wherein determining the level of usage represents the useable minutes or data of the device.

11. The system of claim 9, comprising a plurality of pools for maintaining unique identifications.

12. The system of claim 9, wherein said unique identification is returned to said pool when said unique identification is inactive on said mobile device.

13. The system of claim 9, wherein a new unique identification is assigned to said mobile device when said unique identification reaches a threshold of minutes or data usage.

14. The system of claim 9, wherein said pool of unique identifications is updated periodically based on usage.

15. A mobile device comprising:
a subscriber identity module card;
at least one processor; and
a memory operatively coupled to said processor, said memory storing program instructions that when executed by said processor, causes said processor to:
provide subscriber information;
request for a mobile subscriber identity;
receive a mobile subscriber identity and an encryption key in accordance with a comparison between the level of usage of the device and the provided subscriber information;
program said subscriber identity module card with said mobile subscriber identity and encryption key; and
establish communications through said subscriber identity module card.

16. The mobile device of claim 15, wherein requesting for said mobile subscriber identity comprises detecting a presence of a WiFi™ network and sending a request to a pool manager having a plurality of mobile subscriber identities through said WiFi™ network.

17. The mobile device of claim 15, wherein requesting for said mobile subscriber identity comprises sending a registration mobile subscriber identity to a pool manager having a plurality of mobile subscriber identities through a carrier network.

18. The mobile device of claim 17, wherein said registration mobile subscriber identity is embedded into said mobile device or synchronized within said mobile device when a WiFi™ network is available.

19. The mobile device of claim 17, wherein said registration mobile subscriber identity is shared among a plurality of devices.

20. The mobile device of claim 15, wherein requesting for said mobile subscriber identity comprises sending a personal mobile subscriber identity to a pool manager having a plurality of mobile subscriber identities and replacing said personal mobile subscriber identity with said mobile subscriber identity.

* * * * *